(12) United States Patent
Sieracki

(10) Patent No.: US 9,829,279 B1
(45) Date of Patent: Nov. 28, 2017

(54) AIMING AND ALIGNMENT SYSTEM FOR A SHELL FIRING WEAPON AND METHOD THEREFOR

(71) Applicant: Jeffrey Mark Sieracki, Clarksville, MD (US)

(72) Inventor: Jeffrey Mark Sieracki, Clarksville, MD (US)

(*) Notice: Subject to any disclaimer, the term of this patent is extended or adjusted under 35 U.S.C. 154(b) by 0 days.

(21) Appl. No.: 14/838,812

(22) Filed: Aug. 28, 2015

Related U.S. Application Data

(62) Division of application No. 13/541,540, filed on Jul. 3, 2012, now Pat. No. 9,151,572.

(60) Provisional application No. 61/504,222, filed on Jul. 3, 2011.

(51) Int. Cl.
 F41G 1/00 (2006.01)
 F41G 3/18 (2006.01)
 G01S 19/13 (2010.01)

(52) U.S. Cl.
 CPC ............ *F41G 3/18* (2013.01); *G01S 19/13* (2013.01)

(58) Field of Classification Search
 CPC .............. F41G 3/00; F41G 3/14; F41G 3/16
 See application file for complete search history.

(56) References Cited

U.S. PATENT DOCUMENTS

| | | | |
|---|---|---|---|
| 2,491,476 A | 12/1949 | Brown | |
| 2,977,858 A | 4/1961 | Jasse | |
| 3,891,323 A * | 6/1975 | Ryan | G01B 11/27 356/154 |
| 3,955,468 A * | 5/1976 | Romilly | F41G 11/00 244/3.1 |
| 4,026,190 A | 5/1977 | Blair | |
| 4,126,394 A * | 11/1978 | Ulrich | G01B 11/26 356/138 |
| 4,306,806 A | 12/1981 | Barron et al. | |
| 4,365,149 A | 12/1982 | Falbel | |

(Continued)

FOREIGN PATENT DOCUMENTS

EP 2538166 A1 12/2012

OTHER PUBLICATIONS

"Engineering Design Handbook—Elements of Armament Engineering Part One Sources of Energy"; AMCP 706-106, Headquarters, U.S. Army Material Command, Aug. 1964.
"Denel Land Systems | Infantry Systems—60mm_Mortar"; http://www.denellandsystems.co.za/infantry_systems/60mm_Mortar.html; downloaded Jun. 7, 2012.

(Continued)

*Primary Examiner* — Gabriel Klein
(74) *Attorney, Agent, or Firm* — Rosenberg, Klein & Lee

(57) ABSTRACT

A system and method for aiming and alignment of a shell firing weapon includes a portable aiming unit that may be located in close proximity to the weapon that includes a reference head for emitting and/or receiving at least one energy ray. The portable aiming unit can be aligned to a reference azimuth, either absolute or relative. A sighting unit is also included in the system and removably mounted to the weapon. The sighting unit includes a reference head that is complementary to the reference head of the portable aiming unit. The at least one energy ray established between the portable aiming unit and the sighting unit provides an accurate relative reference of directing the weapons fire and monitoring linear and angular displacement of the weapon as it is fired so that corrections can be made in aiming the weapon in response thereto.

21 Claims, 11 Drawing Sheets

(56) References Cited

U.S. PATENT DOCUMENTS

| | | | |
|---|---|---|---|
| 4,786,966 A * | 11/1988 | Hanson | F41G 3/165 224/181 |
| 5,280,744 A | 1/1994 | DeCarlo et al. | |
| 5,586,887 A | 12/1996 | McNelis et al. | |
| 5,672,840 A | 9/1997 | Sage et al. | |
| 5,686,690 A | 11/1997 | Lougheed et al. | |
| 5,822,713 A | 10/1998 | Profeta | |
| 6,059,573 A | 5/2000 | Patel | |
| 6,123,006 A | 9/2000 | Bedford, Jr. et al. | |
| 6,456,567 B1 | 9/2002 | Blevins et al. | |
| 6,805,036 B2 | 10/2004 | Malakatas | |
| 6,973,865 B1 | 12/2005 | Duselis et al. | |
| 7,079,986 B2 | 7/2006 | Sieracki et al. | |
| 7,225,548 B2 | 6/2007 | Sieracki et al. | |
| 7,526,403 B2 | 4/2009 | Hogan et al. | |
| 7,636,198 B2 | 12/2009 | Larson | |
| 7,637,198 B2 | 12/2009 | De Villiers et al. | |
| 8,006,427 B2 * | 8/2011 | Blevins | F41G 3/323 42/115 |
| 8,047,118 B1 | 11/2011 | Teetzel et al. | |
| 8,152,064 B2 | 4/2012 | Svane et al. | |
| 8,311,757 B2 * | 11/2012 | Lin | F41G 1/50 702/141 |
| 2009/0070058 A1 | 3/2009 | Lin | |
| 2009/0188976 A1 | 7/2009 | Gunnarsson et al. | |
| 2011/0179689 A1 | 7/2011 | Blevins et al. | |
| 2011/0297744 A1 | 12/2011 | Schneider et al. | |
| 2012/0118955 A1 | 5/2012 | Cox et al. | |
| 2014/0118723 A1 | 5/2014 | Winker et al. | |

OTHER PUBLICATIONS

Lowe, D.G., "Distinctive Image Features from Scale-Invariant Keypoints"; International journal of computer vision 60, No. 2 (2004); pp. 91-110.

Bauer, et al.; "Angular Measurements in Azimuth and Elevation using 77 GHz Radar Sensors"; In Radar Conference (EuRAD), 2010 European, pp. 184-187. IEEE, 2010.

"M29A1 81mm Medium Mortar—Gary's U.S. infantry Weapons Reference Guide"; http://www.intres.com/gp/military/infantry/mortar/M29.html; downloaded Jun. 5, 2012.

"Mortars"; FM 3-22.90; Headquarters, Department of the Army; Dec. 2007.

"Integrated Mortar Advance Digital Targeting Systems (IMADTS)"; http://www.csir.co.za/dpss/conference/docs/Integrated_Mortar_Advance_Digital_Targeting_Systems.pdf. Last Modified Jul. 5, 2009.

"Guide to Military Optical Assemblies"; SEILER Instrument & Manufacturing Co. Inc.; Feb. 23, 2011.

Spong, Robert N. "An efficient method for computing azimuth and elevation angle estimates from monopulse ratio measurements of a phased array pencil beam radar with two-dimensional angle steering." In Radar Conference, 1999. The Record of the 1999 IEEE, pp. 309-314. IEEE, 1999.

"Department of Defense Test Method Standard—Environmental Engineering Considerations and Laboratory Tests"; MIL-STD-810G; Oct. 31, 2008.

"M252 Mortar Fact File United States Army"; http://www.army.mil/factfiles/equipment/indirect/m252.html; downloaded Jun. 5, 2012.

* cited by examiner

AIMING AND ALIGNMENT SYSTEM FOR A SHELL FIRING WEAPON AND METHOD THEREFOR

RELATED APPLICATION DATA

This application is a Divisional patent application of application Ser. No. 13/541,540, filed on 3 Jul. 2012, now U.S. Pat. No. 9,151,572, which is based on Provisional Patent Application No. 61/504,222, filed 3 Jul. 2011. The entire disclosure of the prior application Ser. No. 13/541,540 is considered a part of the disclosure of this Divisional application and is hereby incorporated by reference.

BACKGROUND OF THE INVENTION

Field of the Invention

This disclosure directs itself to an aiming and alignment system for a shell firing weapon and a method for aiming and aligning a shell firing weapon. In particular, this disclosure directs itself to a system that includes a portable aiming unit that is positionable in close proximity to the weapon and provides a relative special reference for use in aiming the weapon. Further, this disclosure directs itself to an aiming and alignment system that includes a sighting unit releasably mounted to the weapon that is adapted along with the portable aiming unit to establish at least one energy beam therebetween for defining a relative reference for aiming the weapon. Still further, this disclosure directs itself to a system where at least one low energy infrared emitter is used to provide an energy beam between the portable aiming unit and the sighting unit and periodically operated to track any displacement of the weapon during it's use.

Prior Art

Alignment systems for shell firing weapons are known in the art. Such systems typically include a sight unit mounted on the gun tube of the weapon, and aligned with it in such a manner that physical set knobs may be adjusted to achieve known, calibrated offsets between the tube and the optical sight. Absolute elevation of the tube is typically determined by observation of a bubble-level on the sight. Leveling of the bubbles by knob adjustment aligns certain tic-marks on the adjustment caliper system which may be read to determine elevation angle of the gun. Azimuth is typically obtained relative to a fixed external reference, such as a pair of poles, referred to as aiming posts, driven into the ground 50 and 100 meters from the weapon. The optical sight unit is arranged so that a telescope portion angles 45 degrees to the left of the true gun azimuth to sight on the posts.

To use such posts, the weapon is first hand set on the ground and aligned to a known absolute reference angle by compass, or, preferably by orientation of the sight unit telescope on a established field reference called an aiming circle. Arithmetic is required on the part of the gunner to adjust the lay of the gun according to the geometry of the configuration and the information obtained. The aiming poles are then placed by one crew member sighting through the sight unit telescope while a second crew member goes into the field and manually adjusts post positions until they are centered in the site reticle and directly behind each other from the gunner's point of view. Once set, azimuth angles are thereafter measured as a deviation from this reference point.

Larger field artillery have similar issues. Although the guns are typically vehicle or trailer mounted, the system still relies on a hand lay of the angle of the vehicle or trailer. In general, for artillery the aiming posts are replaced with an optical collimator that can be placed behind the guns and at a much closer distance.

Monitoring of hand laid weapon gun tube orientation presents many inherent difficulties. Supported by earth, they are mechanically independent of all primary aiming systems. Elevation tracking typically relies on bubble level type systems, while azimuth is typically referenced to aiming poles set out at a significant distance from the gun. Gun lay is a precision exercise in geometry and subject to human errors. Aiming poles require careful teamwork to place, and setting them at a sufficient distance can be problematic depending on firing position and potential for exposure to enemy fire. Once set, the guns are subject to extreme shock loading during operation, requiring round by round checks and adjustment. Each check requires that the gunner place his eye at the sight unit, judge the situation and make precision adjustment. Fatigue raises the probability of human error. With no means to directly measure round departure angles, the Fire Direction Center relies entirely on the gunner's acumen in maintaining the specified orientations as well as discovering and reporting errors.

The following considerations must be taken into account in developing a solution to the many limitations of the prior art.

1. An accurate solution must rely on at least one system component being physically isolated from the gun in order to provide a static reference that is immune to firing disturbances.
2. Placement for this component should preferably be along the standard 45° degree aiming post line. This prevents interference with established gun crew practices, minimizes safety hazards, and facilitates setup in a manner that is consistent with current training. It also minimizes sensor risk as it is known that these weapons shift, move earth, and occasionally even collapse forward due to failure of the weapon's bipod.
3. Placement of the static reference component at a short distance from the gun enables much faster setup and relaying times; however, placement as an modification to existing aiming post lights is an option. For larger artillery, upgrading the optical collimator to include systems disclosed herein is an option as well.
4. The electronic system should not interfere with traditional aiming methods, so that any new system can be transitioned into the field using existing weapon gun tubes and provide fall-back redundancy.
5. Concentrating additional technical components in the stand-off reference is preferable in order to minimize the need to modify the deployed weapon system, and minimize the need to engineer ultra-rugged components that can be mounted on the gun tube of the weapon.
6. The best placement for electronic guidance at the gun is the sight unit. A modified sight unit provides a very straightforward upgrade path to any currently deployed system, as well as maintaining a standard, reliable physical attachment point on the weapon's gun tube. Moreover, crews are already trained to remove the optical sight unit during early firing (before the gun is set) to avoid shock; similar treatment for digital components will similarly limit their exposure to excessive shock.
7. Low-energy IR has an excellent energy modality to use to link the stand-off reference component with the gun-mounted sight. By keeping the range between the components short, the system will be able to operate under similar dust and moisture conditions as those necessary to accommodate aiming poles, and with low enough energy emission to prevent the system from presenting any significant IR signature over and above the typical environmental background.

8. The system should be small, light-weight, and easily man-portable without adding significant new load to the current equipment roster.

9. Most guns have about 400 mils of range built into the gears or bipod. That means if the deflection needed is greater than 400 mils, the crew must pick up the gun and physically move it to meet the desired data. Any system that does not provide a 6400 mil capability (360 degrees) must provide for extremely rapid tear-down and setup so that it does not pose a burden for large changes in firing azimuth.

SUMMARY OF THE INVENTION

An aiming and alignment system for a shell firing weapon is provided. The system includes a portable aiming unit radially displaced from the weapon. The portable aiming unit includes a device for establishing at least an azimuth reference and a reference head. The system further includes a sighting unit mounted to the weapon for aligning the weapon relative to an azimuth and an elevation established relative to the portable aiming unit. The sighting unit includes a sensing head for establishing at least one signal with the reference head for determining a degree of alignment in azimuth therebetween and outputs an indication thereof.

From another aspect, a method of aiming at least one shell firing weapon is also provided. The method includes the steps of positioning a portable aiming unit radially from the weapon, and establishing at least one spatial reference at the portable aiming unit. The method further includes the steps of locating a sighting unit on said weapon, and establishing at least one energy emission between the portable aiming unit and the sighting unit and using the energy emission to determine a relative spatial alignment therebetween. Further, the method includes the step of outputting a visual indication of the relative spatial alignment.

DETAILED DESCRIPTION OF THE PREFERRED EMBODIMENTS

Figure 1A:
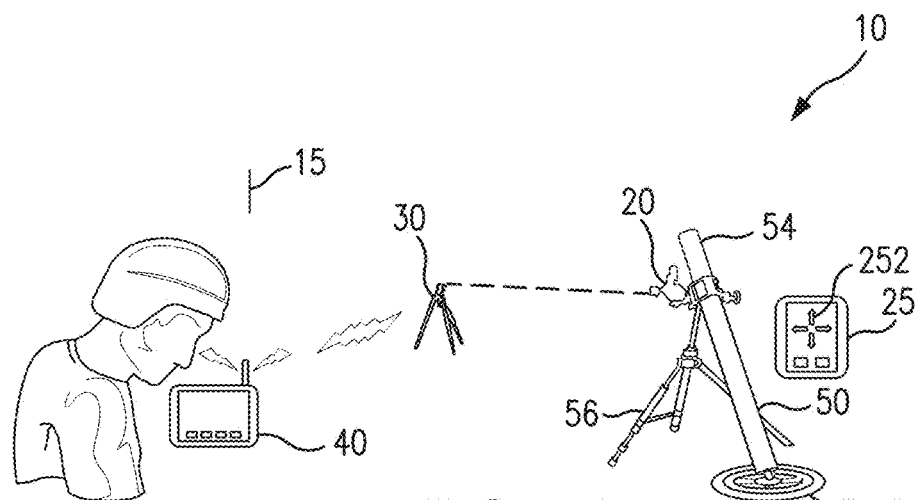
FIG. 1A is a schematic illustration of the aiming and alignment system of the present invention.

Referring to FIG. 1A, there is shown an illustration of the aiming and alignment system 10 for providing an easily deployable spatial reference for use with a shell firing weapon 50, such as the mortar being illustrated. The major components of weapon 50 includes a gun tube 54 supported by a base plate 52 and a bipod 56. System 10 employs an energy beam reference frame created between a small tripod-mounted tracking unit, hereinafter referred to as a portable aiming unit 30, and a sighting unit 20, which may be a modular electronic addition to a conventional optical gun sight for the weapon 50 or an electronic replacement therefore. The portable aiming unit 30 can be deployed extremely quickly, placed at a distance of less than 5 meters from weapon 50 on the same line as that of conventional aiming posts. As the design of system 10 provides parallax correction for the relative alignment of weapon 50, it is contemplated that the portable aiming unit 30 will be located approximately 2 meters from weapon 50 or closer. It is contemplated that many users trained in locating an aiming post a distance of 50 meters from a weapon will still desire to locate the portable aiming post 30 at a distance of 50 meters from the weapon 50 that utilizes the sighting unit 20. System 10 will still provide accurate aiming and weapon displacement monitoring when the portable aiming post 30 is positioned at a distance of 50 meters from the weapon 50. The portable aiming unit 30 may also be placed on an aiming post, rather than a tripod, in place of conventional aiming post lights. Although a conventional aiming post 15 is illustrated in FIG. 1A as a means of providing redundancy and would provide a means for gun crews to obtain the necessary comfort level with system 10 to be confident in relying thereon, it is only a convenient option that may be utilized by users of system 10 and not a necessary element thereof.

The conventional aiming post 15 is usually located at a distance of 50 meters, and at times a second such aiming post (not shown) would be place at 100 meters. A gun crew utilizes the aiming posts to establish a relative frame of reference for directing fire from a weapon such as the weapon 50. As will be discussed in following paragraphs, the large distances used in placing the conventional aiming posts minimizes the effect of parallax and thereby simplifies the gun crews calculations necessary for directing projectiles to particular target coordinates. The portable aiming unit 30 is an extremely light weight, tripod or stake mounted device that includes components to point it's reference head at the sighting unit 20, and may include one or more components to determine absolute azimuth (such as an embedded GPS, an inertial measurement unit, a fluxgate compass, etc.) and a transmission system to communicate data in real-time to a remote Fire Direction Center processor 40, which may be embodied in a tablet type computer or personal digital assistant (PDA) type device and with the sighting unit 20. Communication between the portable aiming unit 30 and the Fire Direction Center processor 40 and/or the sighting unit 20 may be a wireless or wired digital communications link.

The gunner is guided in aligning the sighting unit 20 with the portable aiming unit 30 by observing a set of arrows 252 on a display of a sighting processor 25, indicating that he should adjust the sighting unit 20 up/down/left/right accordingly, or that the system is in alignment. It may also be enabled to detect and warn of an excessive angle of roll of the weapon azimuth aiming plain relative to the earth, which can lead to aiming errors. The sighting processor 25 may be embodied in a tablet type computer or PDA which may be mountable on the sighting unit and/or used separate therefrom. Likewise, a separate display unit may be linked to the sighting processor 25 so that it may more conveniently be viewed by the gunner. Other known display systems for directing the displacement deviations may also be used to aid in aligning the sighting unit 20.

Figure 1B:
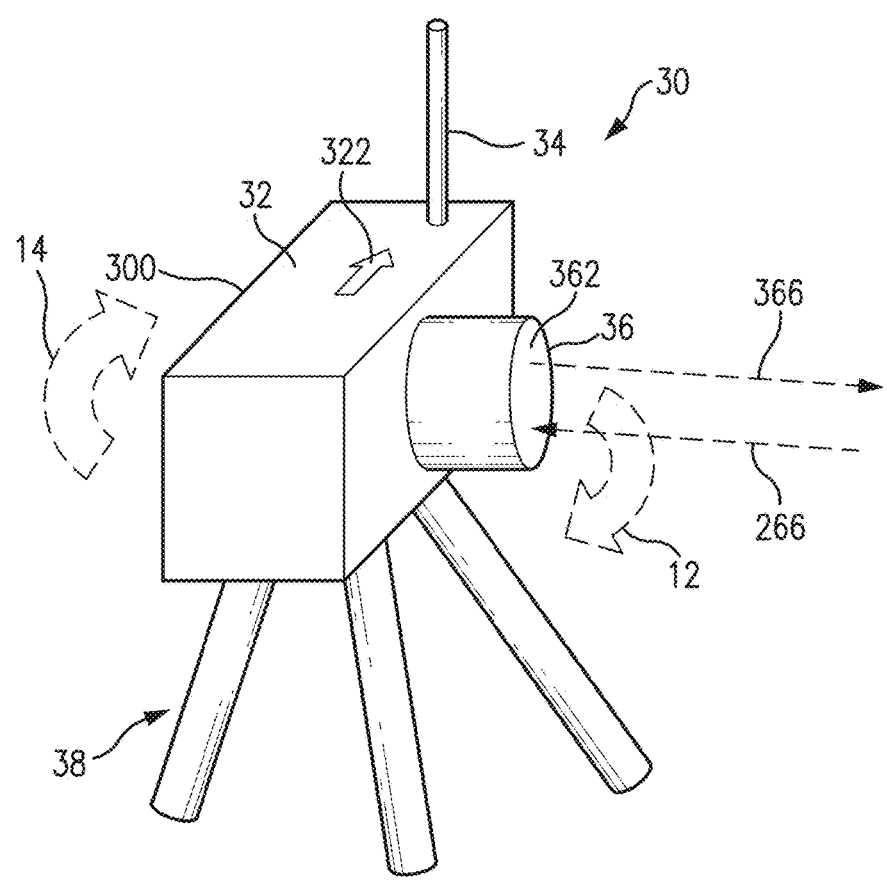
FIG. 1B is a schematic illustration of one configuration of the portable aiming unit of the present invention.

Referring now to FIG. 1B, there is shown a schematic illustration of the portable aiming unit 30. The portable aiming unit 30 includes an electronic aiming head 300 mounted on a tripod 38 that is swivelable in both azimuth and elevation, as indicated by the directional arrows 12 and 14, and lockable in a chosen orientation, as is well known in the art. The aiming head 300 has a housing 32 that may carry a reference marking 322 which can used to manually orient the housing to align with a particular relative or absolute azimuth reference, such as an azimuth of a selected fixed object or a compass heading, as examples. Alternately, the portable aiming unit 30 may be provided with a display and/or fixed or removable processing device like that which may be provided to implement the sighting processor 25 of the sighting unit 20. For establishing orientation of the housing with respect to an absolute reference, the electronic aiming head 300 includes a device such as a GPS receiver, a three axis accelerometer, a fluxgate compass, or the like. Where a PDA type device defines the processor for portable aiming unit 30, the device for establishing the absolute reference may be incorporated therein.

The details for establishing the relative spatial alignment between the portable aiming unit 30 and the sighting unit 20 will be described in following paragraphs. In order to accomplish the alignment between the portable aiming unit 30 and the sighting unit 20, the portable aiming unit 30 includes reference head 36 that is oriented at a known angle with respect to the reference marking 322 and likewise for any absolute or relative reference established by the electronic aiming head 300. Thus, the orientation of the reference head is a fixed and known angle offset from the relative or absolute reference of the portable aiming unit 30. The reference head 36 may emit and/or receive a low energy beam 366, 266. The energy may be acoustic (audible or ultrasonic), optical or electromagnetic in a radio frequency band. Where optical signals are being utilized, the reference head 36 may include an optical filter plate 362 through which the optical alignment signals pass. Still further, the reference head 36 can be used to communicate with the sighting unit 20 or a secondary optical and/or RF link using the antenna 34 may be employed.

The alignment between the portable aiming unit 30 and the sighting unit 20 is achieved by respective transmission and reception of signals between complementary reference heads of the portable aiming unit 30 and the sighting unit 20. While the signals can be generated using acoustic, optical or radio frequency energy beams, it is felt that low power infrared (IR) sources are most practical. The IR sources may be ordinary, IR non-laser diodes. Non-coherent, low-energy, low-optical-bloom point sources may be preferable over laser diodes even though they will increase setup-tolerance angles. Directionality of the emitter is more a concern of stealth and laser emissions, because they have a higher probability of detectable reflection, may not be a good choice in this application.

Figure 3A:
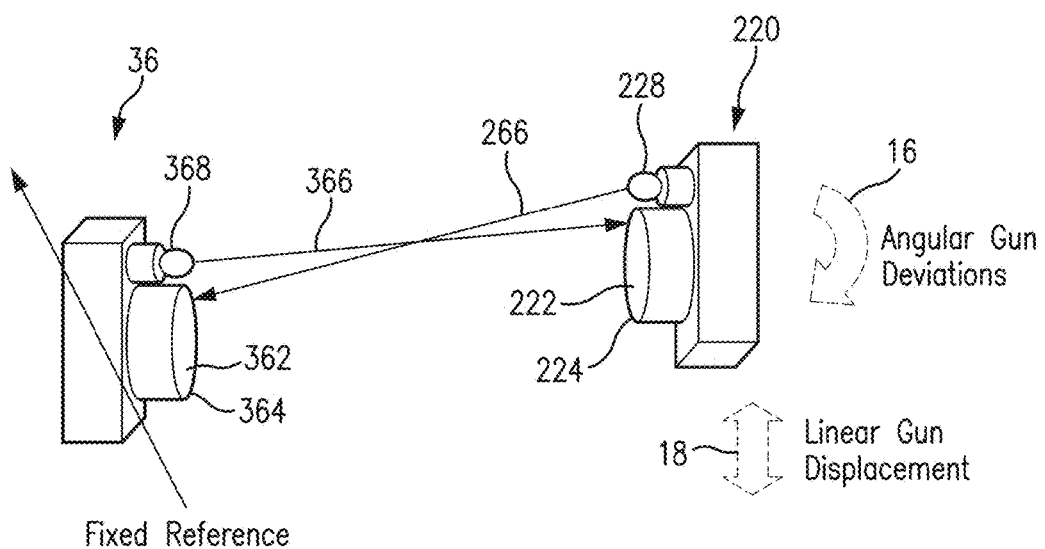
FIG. 3A is a schematic illustration of one reference head arrangement of the present invention.

In FIG. 3A, a dual beam approach, a symmetric arrangement is incorporated into the reference head 220 of the sighting unit 20 and the reference head 36 of the portable aiming unit 30. The symmetric arrangement comprises a respective low-power IR source 228, 368 placed proximal to a respective complementary IR sensor 224, 364, which can be a narrow field, CCD type camera. The cameras include respective filters 222, 362 to match the corresponding IR source 368, 228. The system determines angles by tracking the relative displacement of spots on the CCD. In theory, a camera field of view of 17 degrees, consistent with a conventional M64-series sight unit, requires a CCD resolution of 304 pixels to track 1 mil angle deviations. A camera field of view of 10 degrees, consistent with a conventional M67 sight unit, requires a CCD resolution of only 179 pixels. Those are bare minimums. In practice, in order to make an accurate and reliable approximation, at least twice this resolution would be used in practice. As a point of reference, modern personal computer connectable cameras (USB PC cameras) achieve 1280×1024 pixels. Mated with custom optics, USB PC cameras provide useable low cost sensors 224, 364. CCD/CMOS camera type elements behind field calibrated, filtered optics are used to track displacements of the very low-energy sources 228, 368. The IR sources 228, 368 interact with the corresponding camera filter plates 362, 222 of the respective lens assembly to control against extraneous light, control intensity, and avoid camera bloom and overloading the respective CCD element. By limiting the intensity at the receiver and providing variable intensity IR sources 228, 368, dynamic compensation for variations in atmospheric moisture, dust, and smoke content can be employed. Communication between the portable aiming unit 30 and the sighting unit 20 provides an input to the sighting processor 25 for use in determining that alignment between the reference heads 220 and 36 has been achieved, directions of displacement necessary to achieve alignment and for monitoring subsequent deviations from alignment.

The illustrated dual-ended beam approach in FIG. 3A is applicable in certain applications because, in addition to angular deviation, indicated by directional arrow 16, of the weapon 50, small linear displacements, indicated by directional arrow 18, must be anticipated as the rounds are fired and the base plate of the weapon is further set. Linear displacement of the gun can be viewed as a small change in angle $\eta$ shown in the diagrams of FIGS. 2A and 2B. The dual-ended system allows for detection and compensation for this displacement. Linear displacements result in different relative directions of displacement on each sensor 224, 364 of similar magnitude, while angular deviations create disproportionate shifts in each. In order to solve the problem in three dimensions (azimuth and elevation), more measurement points are required and thus the earth's gravity is added as a primary reference frame, as will be discussed in following paragraphs. To establish this reference frame, multi-axis accelerometers are included in the portable aiming unit 30 and may also be incorporated in the sighting unit 20. The calculations performed are standard trigonometric calculations used for calculating displacement from a reference. Such calculations are illustrated in U.S. Pat. No. 7,225,548 and many of these calculations are currently performed manually by gunnery crews using conventional sight units.

Figure 3B:
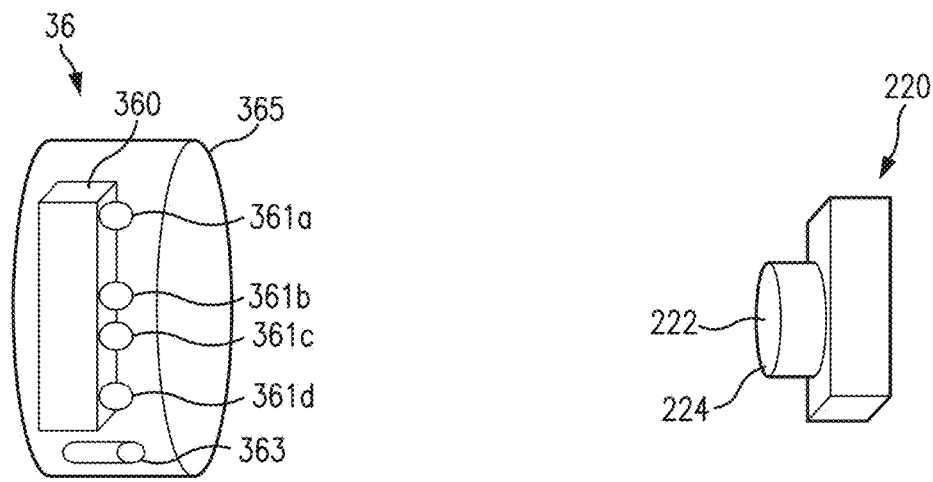
FIG. 3B is a schematic illustration of another head reference head arrangement the present invention using a constellation of emitters.

FIG. 3B shows an alternative, single-ended approach. In this scheme, one of the reference heads 36 and 220 is fitted with an emitter constellation, arranged in an optimized spatial pattern, and the other fitted with a aCCD or CMOS image sensor, which may be in the form of the CCD camera discussed above. It is assumed that greater stealth is achieved by placing the emitters in the reference head 36 of the portable aiming unit 30, so that the emissions are not directed down range (in the direction of fire), but from a technical stand point, the respective locations of the emitters and sensor can be interchanged. The reference head 36 includes an emitter 360 that has a plurality of point sources 361a, 361b, 361c and 361d. The number of point sources can vary and the number of sources being illustrated herein is only meant to be exemplary.

The constellation may comprise individual sources, as illustrated, or may include a single emitter and an optical pattern disk (not shown) that has been optimized for its correlation properties. Pure angle changes result in a displacement of the image, while linear displacement results in parallax changes to the relative points in the pattern. The two arrangements illustrated in FIGS. 3A and 3B are not meant to be exclusive, they exhibit different, potentially complimentary approaches that can be combined in any given implementation of system 10.

The reference head 36 shown in FIG. 3B includes a blinder ring 365 to further limit off-axis visibility of the IR sources for stealth. This is particularly applicable in the case of non-laser sources such as light emitting diodes (LEDs). Reference head 36 further includes an aiming laser 363; an optical red-dot pointer diode used to allow very quick setup of the device. The aiming laser 363 is configured to operate responsive to operation of a momentary switch, so that a field user can activate it while swiveling the housing 32 of the portable aiming unit 30 on its tripod 38 and quickly achieve a course alignment with the reference head 220 of the sighting unit 20 receiving head.

There are a variety of industrial and scientific technology devices for angle-of-incidence detection, some of which do not rely on an imaging sensor. These may alternately be used in system 10. However, most of those alternatives are crucially dependent on fixing other variables in the system, and/or highly priced. Whereas, inexpensive CCD/CMOS cameras are ubiquitous and offer far greater flexibility than can be achieved with dedicated angle sensors in solving the aiming problem. Angle-shielded photo-transistors and/or diode sensors could also replace the imaging elements described above. However, the multi-dimensional measurement of a reference cluster of point sources provided by the arrangement shown in FIG. 3B is significantly enabled by using calibrated imaging type optics.

Figure 4A:
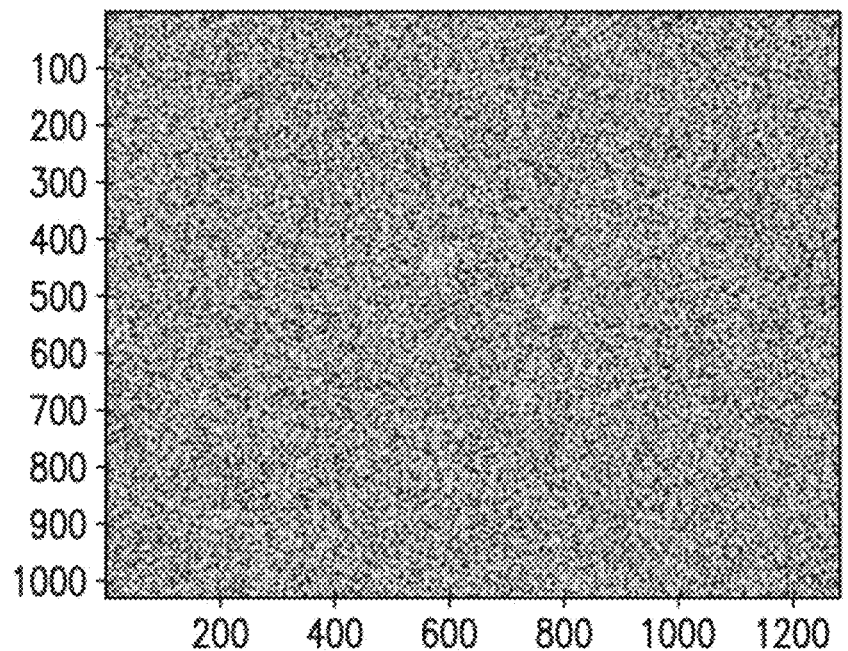
FIG. 4A is an unprocessed image of a constellation of point IR sources in a noisy environment.
Figure 4B:
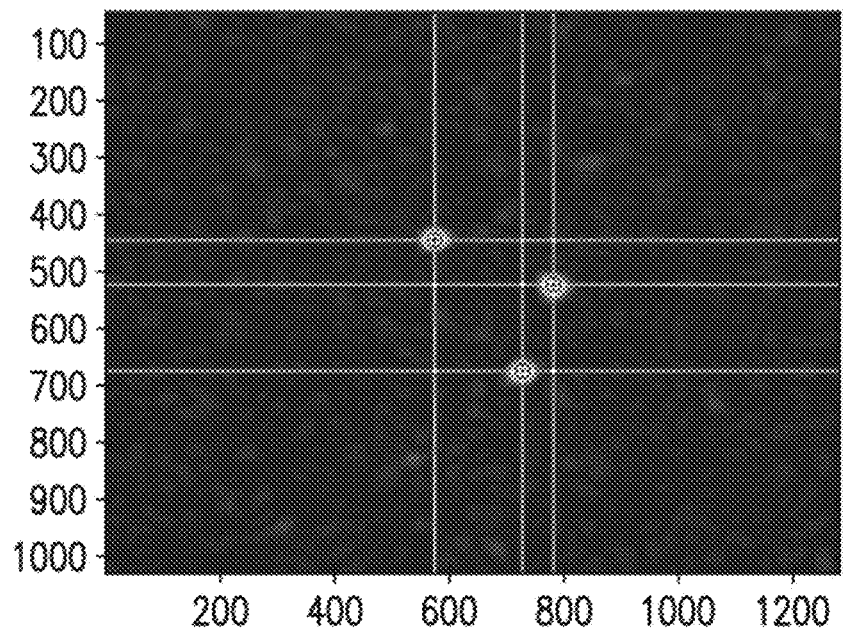
FIG. 4B is an image showing the effect of image processing to the constellation of point IR sources in the noisy environment presented in the image of FIG. 4A.
Figure 4C:
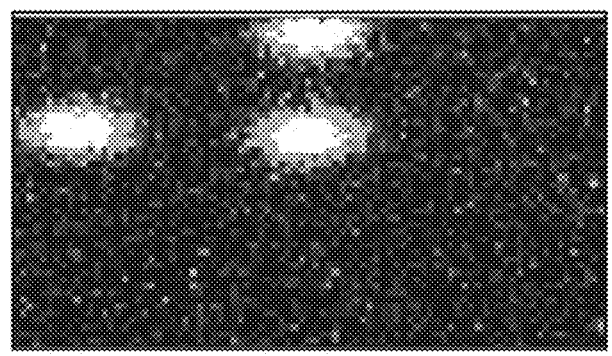
FIG. 4C is an image produced using a low-resolution sensor receiving emissions from a constellation of point IR sources after image processing.

Referring now to FIGS. 4A, 4B and 4C, there is shown the results of using various signal processing techniques to recover and track LED point clusters in very high-noise environments that would be typical of an uncontrolled field environment. In FIG. 4A, there is shown the received source image in a high noise environment. The image of the recovered point cluster following image processing, with the intersecting vertical and horizontal lines showing the precise recovered center points of each LED in the cluster, is shown in FIG. 4B. The method achieves sub-pixel accuracy using fast, cross-correlation processing. Hence, lower resolution sensors could be employed to minimize power consumption and costs.

FIG. 4C shows the results of a similar constellation using inexpensive, low-resolution sensors and utilization of a different image processing technique. Recovery of the image of the constellation is again successful in a noisy environment because the processing applies a matched filter to fit and track the center of each optical bloom, and the center points thereof can be recovered to sub-pixel accuracy with only minor assumptions about the shape of the beam (bloom) cross-section. In one working embodiment, the apparent optical cross-sections were able to be measured at the time of set-up to self-calibrate the processing. The optical cross-sections can also be periodically recalibrated to allow for changing conditions, including, but not limited to rain, dust, or smoke degrading the optical path.

Cross-correlation and matched filter approaches for feature discovery are known in the imagine processing art. In an example embodiment we make use of a two dimensional Gaussian prototype function with $\sigma_x$, $\sigma_x$ and rotation optimized to match each optical bloom pattern. A convolution or cross-correlation of this function creates with raw data, as shown in FIG. 4A, produces a very low noise output image as shown in FIG. 4B, wherein we can easily locate the peaks and thus estimate the center points of each emitter at a sub-pixel level. The relative motion of these emitter points and the distortion of the constellation can be ascertained at very high accuracy. Certain implementations further make use of the joint relationships of the constellation to overcome extremes in signal to noise ratios; this is achieved by using a matched filter constructed from the combination of Gaussians previously detected.

Figure 9:
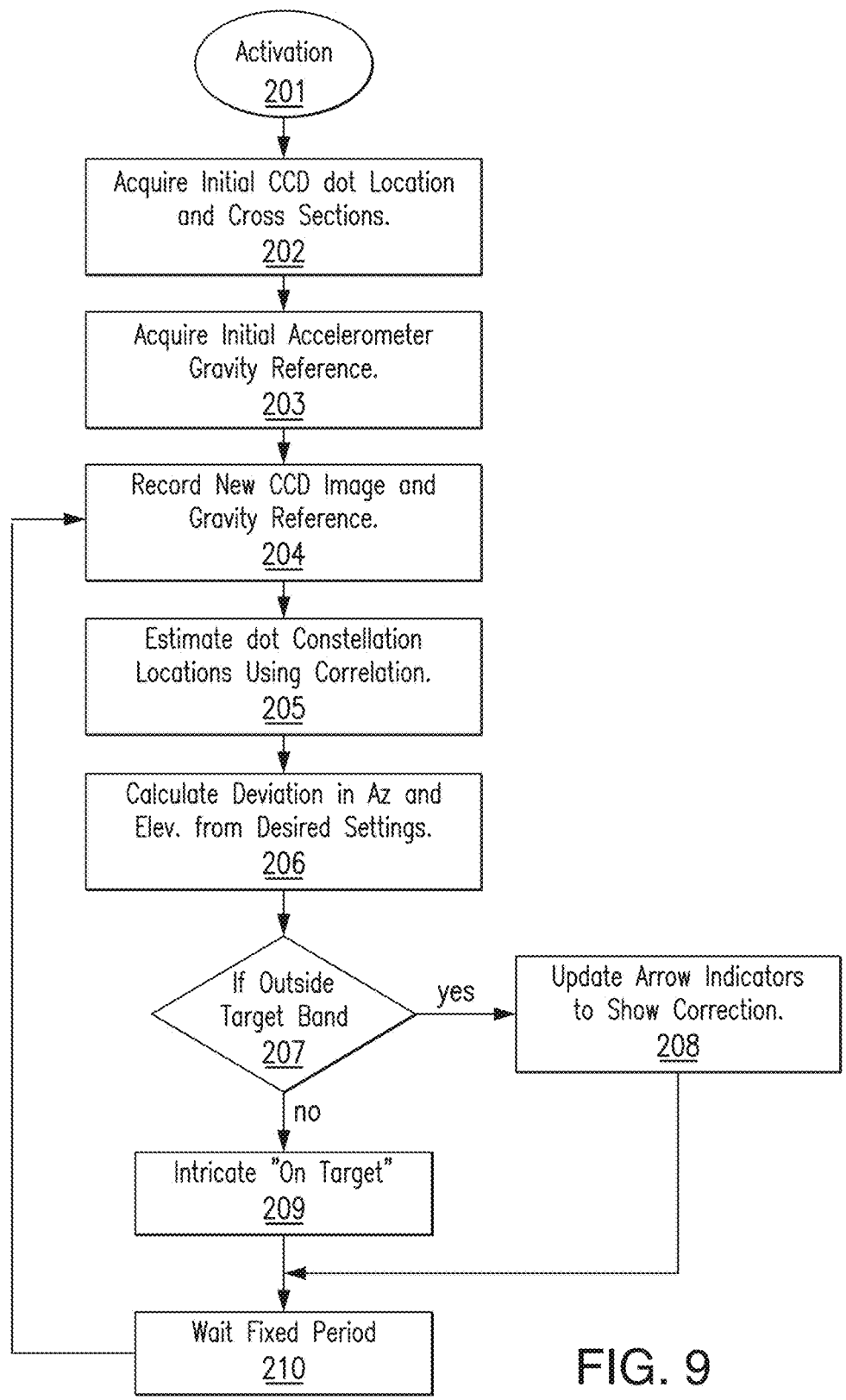
FIG. 9 is a flow chart of illustrating the alignment system process of the present invention.

The basic alignment system process is illustrated in FIG. 9. The process begins in block 201 with activation of the system. In block 202 the locations of the initial dot image locations and cross-section on the image sensor (CCD/CMOS) are acquired. From block 202, the flow passes to block 203 where the initial accelerometer gravity reference is acquired. Then, in block 204 the current received image and gravity reference are acquired. The acquired data is then subjected to image processing where correlation is used to estimate the dot constellation locations in block 205. It should be noted that the process being illustrated in FIG. 9 may be applied to an image constellation of a single dot or many dots. The flow then passes to block 206, where azimuth and elevation deviations from the desired settings are calculated. The calculated deviations are used in the test block 207 to determine whether the calculated values exceed threshold values that define a tolerance band for the required azimuth and elevation positions. If the deviations are both within the tolerance band, then an indication, in block 209, is output to the gunner that the weapon is "on target." From block 209 the flow passes to block 210 where the flow halts for a set delay time period and then passes back to block 204 to repeat the process from that point on to monitor azimuth and elevation as the weapon is fired. If in block 207 the deviation of either azimuth or elevation is determined to be outside the tolerance band, then flow passes to block 208. In block 208 appropriate arrow indicators are enabled to show the gunner the direction of adjustment(s) that need to be made and then the flow passes to block 210 to apply the delay time period before the process repeats from block 204.

Figure 2A:
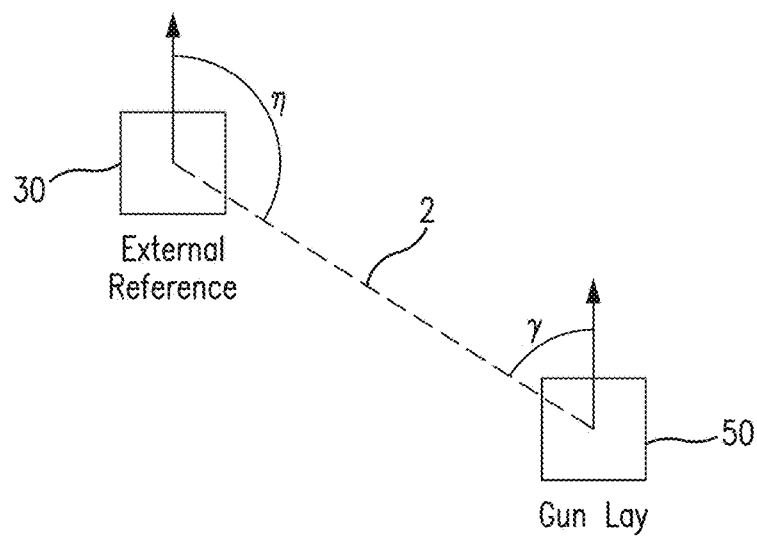
FIG. 2A is a diagram illustrating the azimuth geometry for the reference energy beam between the portable aiming unit ant the sighting unit of the present invention.
Figure 2B:
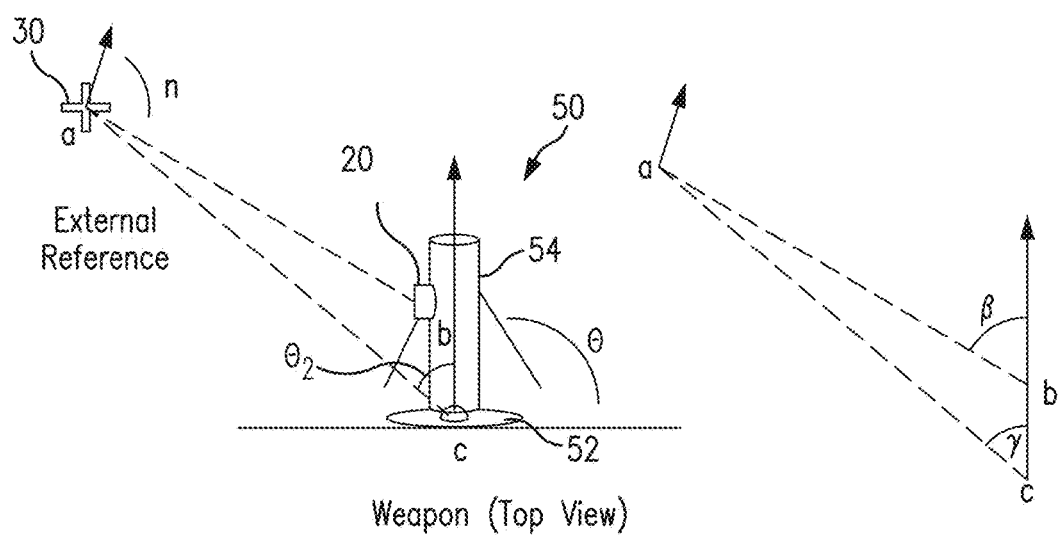
FIG. 2B is a diagram illustrating the problem of parallax in the azimuth geometry between the portable aiming unit ant the sighting unit of the present invention.

FIGS. 2A and 2B schematically illustrate the solution to the azimuth measurement problem using a common reference beam between the nearby portable aiming unit 30 and the weapon 50. The system relies on measuring angles relative to a common reference beam line 2 provided by at least one emitter, the stealthiest of which would be provided by a low energy IR beam. The angle η provides a reference of the beam angle relative to an absolute reference, such as true north, or a relative reference established by referencing the azimuth of some fixed structure, an aiming circle or fire control data provided by the Fire Direction Center or other command authority. An absolute reference can be established using an internal compass, inertial measurement unit, GPS, or other such device. The angle γ provides a reference for the gun azimuth relative to the incident beam angle. Deviation is measured relative to the line 2 defined by the beam, and calculation of true azimuth is simply a linear sum. The system relies on measuring angles relative to the reference beam line 2. By establishing a fixed, external reference, the system is not dependent on the vagaries of shifting earth or firing shock, and gun angle drift and deviation can be reliably tracked. If the external reference automatically aligns to Fire Direction Center data then it becomes a "set-and-forget" unit. Even if it is knocked over, setup time will be quick enough to make re-establishing live gun tracking a trivial operation.

FIG. 2B illustrates the geometry of the parallax problem in determining azimuth using a typical sight unit mounting point on a weapon. The angle of interest is gun deviation from a known lay of the weapon. Viewed top-down, the weapon 50 pivots in azimuth at the base plate 52 at a point marked c. If the base plate 52 is assumed to be fixed, the deviation of interest would be a change in angle θ. That change is equivalent in magnitude to a change in $\theta_2$, measured from the reference aiming point a provided by the portable aiming unit 30. However, the sighting unit 20 is mounted at point b experiences a different deviation against the reference aiming point a due to its displacement away from the pivot point c.

The triangle shown on the right abstracts the issues. While the angle γ directly mirrors gun deviation, the angle β does not. It must be corrected by a factor of $$\arctan\left(\frac{\cos(\gamma) * cb}{ca}\right).$$

Placing conventional aiming posts at typical distances of 50 and 100 meters, reduces the parallax error to be negligible. Placing the aiming point closer provides the advantage of security of the user's wellbeing in the face of enemy fire as well as much faster setup time, but requires correction of the parallax angle error. This can be accomplished either optically, as in an infinite reference collimator, or computationally using the sighting unit's processor. As system 10 processes information digitally, parallax correction presents no problem for this computer-based system. Hence, the portable aiming unit 30 can reliably be placed at a distance of less than 5 meters from the weapon 50. A distance of 2 meters has been selected and used as a reasonable choice for location the portable aiming unit 30, however, that in not a limiting value and a closer or more distant position of the portable aiming unit 30 to the weapon 50 is possible. As has been previously stated, this is a significant advance for the safety of mortar crews.

In system 10 the optical angle measurement system operates in two dimensions; deviation in elevation can be calculated and reported in a similar fashion to that of deviation in azimuth. Since, the earth's gravity provides a reliable absolute external reference frame, and the sighting unit 20 includes a multi-axis accelerometer rated to give at least comparable resolution to the conventional bubble levels currently employed, that absolute reference can be utilized to solve the elevation tracking issue. The accelerometer is selected to survive shock loads equivalent to those applied to current conventional sighting units. As with current conventional sighting units, practical operation may include a removal step while the weapon base plate is set in by initial round firings.

Having the both methods readily available allows for both to be utilized where one method is used to verify the other in an algorithm that integrates the two data sources. For using the earth's gravity as a reference via accelerometers, a smoothing filter and artifact detection process is used to track a moving average of the earth's gravity direction relative to both the sighting unit 20 and the portable aiming unit 30. This is used to fix certain parameters of relative motion as the values for the azimuth and elevation are computed from the optical point data previously described. Thresholds are applied to ensure that the measurements are self consistent and the user is notified if uncertainty or possible equipment failure modes are determined based on the thresholds being exceeded.

Figure 5A:
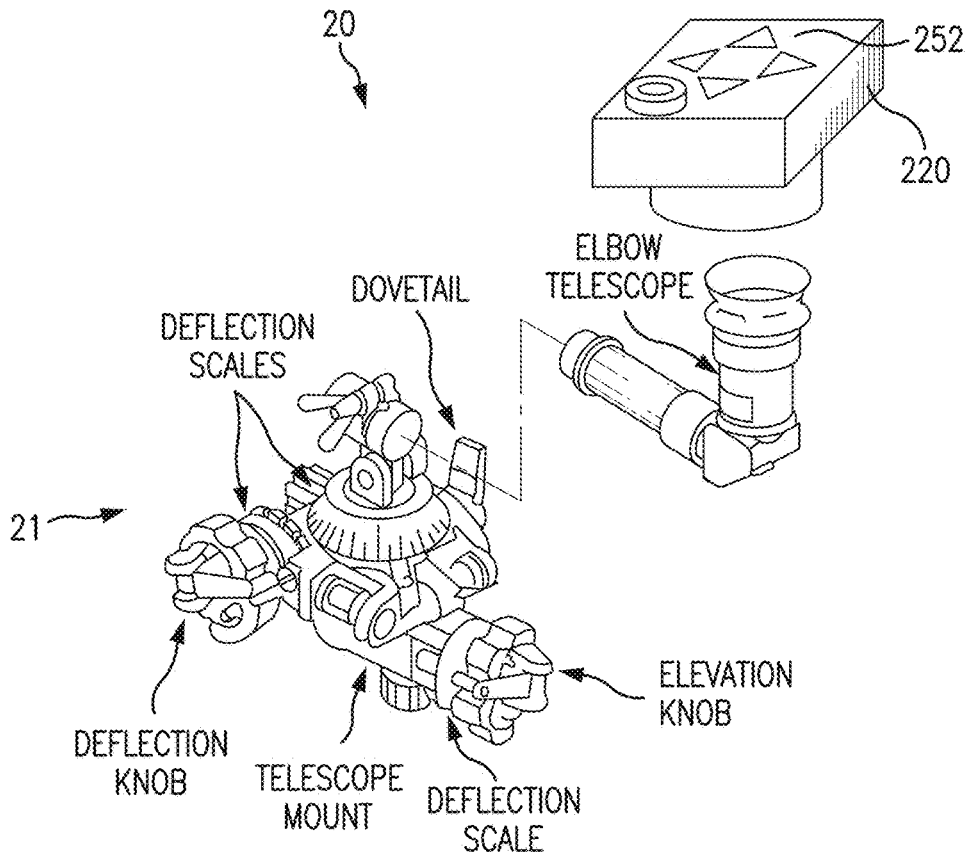
FIG. 5A is one implementation of a sighting unit of the present invention.

The sighting unit 20 may be implemented in several ways. One such implementation is schematically illustrated in FIG. 5A. For this implementation, a conventional optical sight unit 21, such as M53, M64, M67, M109, etc., is modified to include the reference head 220, which may be implemented with an optical system and sensor as previously described or a calibrated sensing camera. Typically the elbow telescope and/or eye-shield are removable from the conventional sight unit. The reference head 220 is either inserted in place of the elbow telescope or fit over and secured to the eyepiece and processing and feedback are provided by the sighting processor 25, which may be incorporated in reference head 220 or may be remote from the optical sight unit 21 and communicate with the reference head 220, as illustrated in FIG. 1A. In this manner, existing sight units can be upgraded directly to accommodate aiming and tracking system 10 and provide feedback to the gunner while the gunner still uses the manual knob settings of the optical sight unit 21. Once the sighting unit 20 is zeroed, the gunner uses familiar mechanical adjustment to set deflection and elevation. The output display 252 of sighting processor 25 will guide the gunner to make weapon orientation changes with indications of displacement direction, such as a simple arrangement of arrows for up, down, left and right. By further modifying the conventional optical sight unit 21 to include encoders integrated into the mechanical sight adjustments, the sighting processor 25 will then be able to track the actual manual settings as they are made.

Figure 5B:
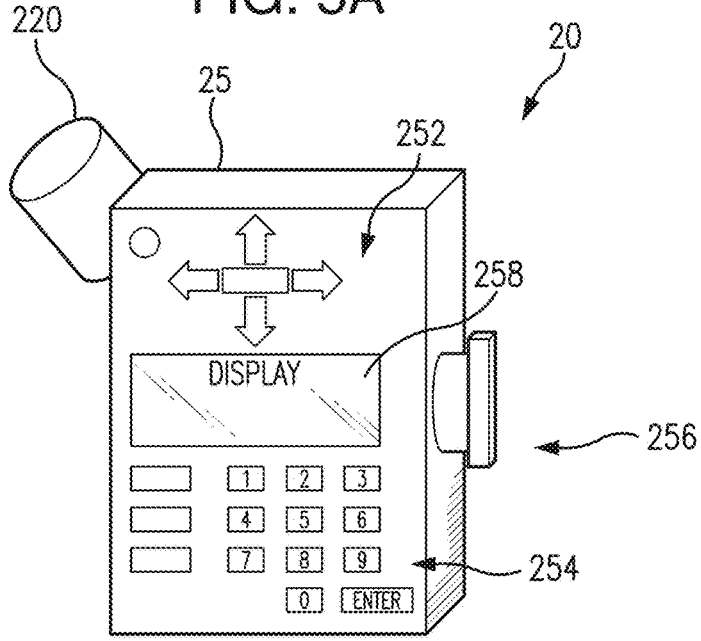
FIG. 5B is another implementation of a sighting unit of the present invention.

Another implementation of the sighting unit 20 is illustrated in FIG. 5B. The sighting unit 20 is implemented by integrating the sighting processor 25 and the reference head 220 as single unit adapted to be mounted to the weapon 50 in place of a conventional optical sight unit using a conventional dovetail mount 256. Elevation and deviation are entered using the keyboard 254, and a simple display system 252 of four arrows, as referred to with respect to FIG. 5A, will direct the gunner in adjusting the gun to match the target orientation. The arrows of display system 252 may be presented on a liquid crystal display (LCD) device 258, which may be part of a CCD/CMOS type camera device. Because feedback is provided on an easily visible display, the gunner does not need to bend down to take sightings. Instead, he can comfortably watch the guidance display from a distance while he adjusts the azimuth and elevation of the weapon 50. Since sighting unit 20 uses the conventional dovetail mount 256 for coupling to the weapon 50, a conventional optical sight unit can be carried by a gunnery crew as a backup, but would no longer be necessary for general operation. The manual knob adjustments of the conventional sight unit previously made by the gunner are now entered with digital entry pads of keyboard 254. A gunner would enter the weapon lay, deflection and elevation data, and the sensors of sighting unit 20, operating at a fixed orientation relative to the weapon, would offset the zero point of the alignment tracking, discussed above with respect to FIGS. 3A and 3B, to automatically compensate. In this configuration, the portable aiming unit 30 need only be placed into a reasonable window (e.g. +/−10 degrees) of the standard 45 degree aiming reference line typically used for shell firing weapons of the type that have heretofore used the conventional optical sight units discussed.

As discussed previously, the portable aiming unit 30 may be positioned about 2 meters from the weapon 50 along the traditional aiming post line. This is not a limitation, as the portable aiming unit 30 may be placed on ground closer to the gun, such as at a position under the bipod of the weapon, or located on a traditional aiming post to maintain completely redundant systems. The portable aiming unit 30 could also be implemented as a replacement aiming post light (c.f. M58/59 or M14E1), or, in the case of larger artillery pieces, as part of an updated collimator system.

Figure 10:
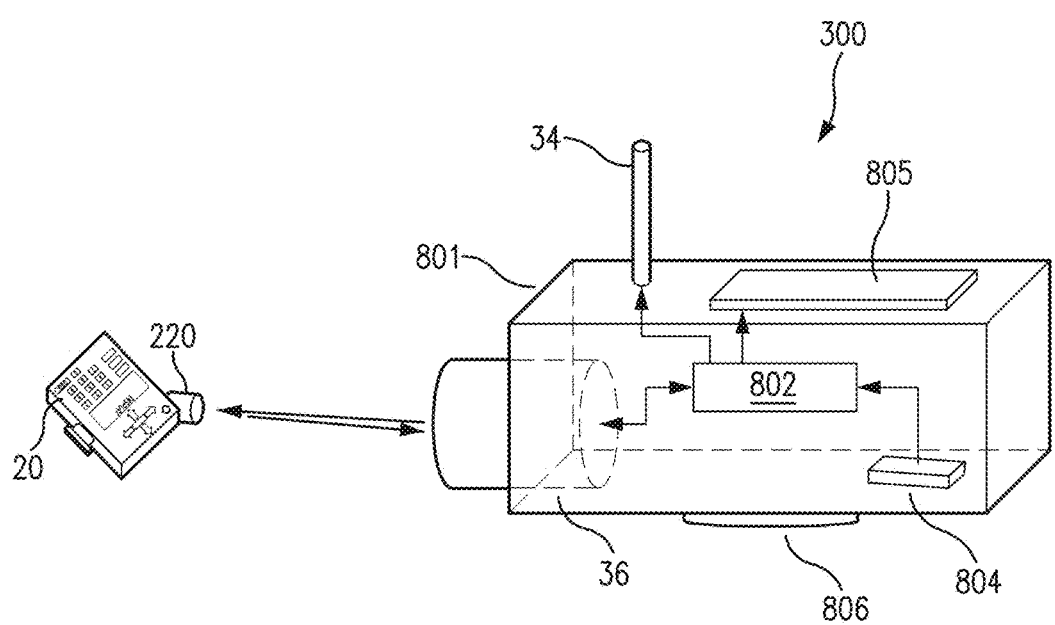
FIG. 10 a schematic illustration of another configuration of the portable aiming unit of the present invention.

A schematic illustration of the electronic aiming head 300 is illustrated in FIG. 10. The unit comprises a case 801, mounted via a three-axis swivel head 806 on a post or tripod, as described above. Reference head 36 is coupled to the case 801 and may be an IR optical LED head that includes elements described in either of FIG. 3A or 3B for effecting presentation of optical point sources, an alignment laser, and may include any image sensor or any other photo-sensitive sensing elements required for tracking the sighting unit 20 or for communications with the sighting unit 20. As previously mentioned, the reference head may alternately use laser diodes in place of low power IR LEDs, acoustic transducers/sensors (preferably ultrasonic), or radio frequency transmission/reception components to provide the aiming beam(s) and/or communications.

An antenna 34 may be mounted to the case 801 to provide for any RF communication functions. Although schematically illustrated as an omnidirectional antenna, antenna 34 may be any type of antenna, omnidirectional or directional, and including such types as stripline antennas and microstrip or patch antennas. Touch-screen display panel 805 provides the conformation display function, and orientation information. The user may also enter information into the system manually using the touch sensitive panel 805. Touch-screen display panel 805 may be detachable from case 801 and communicate with the processor and communication unit 802 by a wired or wireless link. Hereto, at least the processor portion of the processor and communication unit 802 and touch-screen display panel 805 may be combined together in the form of a tablet computing device or PDA.

The case 801 houses a sensor group 804 that provides both 3-axis accelerometer information and 3-axis flux-gate compass information for absolute orientation. The processor and communication unit 802 combines information received from reference head 36, the touch-screen display panel 805 and any radio frequency link established through antenna 34, interacts with the user, and communicates with the Fire Direction Center processor 40 (shown in FIG. 1A) and/or the reference head 220 of the sighting unit 20. Fire Direction Center processor 40, which may be a tablet type computer or PDA may be coupled with other databases for convenient overlay of information. A general system which projects information on a large nearby display can provide a convenient multi-user interface for viewing the aggregate data.

The processor and communication unit 802 includes the interfaces necessary to communicate with the touch-screen display panel 805, the reference head 36 and the sensor group 804. The processor and communication unit 802 may further include the radio frequency transceiver for use with antenna 34. The radio frequency transceiver may be a separate device or circuit board that is electrically coupled to the processor of the processor and communication unit 802. The reference head 36 is aligned to the reference head 220 of the sighting unit 20 during setup, as will be described in following paragraphs.

The steps for deploying the weapon 50 using system 10 proceed as follows.

1. The gun tube 54, base plate 52, and bipod 56 are assembled as is usual.
2. The sighting unit 20 is placed on the gun, in the usual fashion.
3. The portable aiming unit 30, 300 is placed in a position along an estimated 45 degree line about 2 meters from the weapon 50 and turned on. This placement is not critical to the functional operation of system 10, but provides advantages of security and safety for the gunnery crew.
4. A crew member stands by the portable aiming unit 30, 300. He loosens the tripod swivel hardware, and switches on the optical red-dot laser diode 363. The portable aiming unit 30, 300 is manipulated on the tripod 38 to place the red dot on the lens aperture of the reference head 220 of sighting unit 20, the tripod swivel hardware is then locked in position, and the laser 363 is switched off. Optionally, for the sighting unit 20 of FIG. 5B, the processor and communication unit 802, using inputs from sensor group 804, computes elevation and azimuth (angle η) and transmits that data to the sighting unit 20.
5. The sighting unit 20 is zeroed by the gunner.
6. The electronic elements of the sight unit will now provide precise deviation information from the set zero point. This deviation will be reported for any change in orientation of the gun tube 54, whether through mechanical adjustment or through firing shock.
7. In the event that the gun tube 54 shifts significantly (while setting the weapon, or during large orientation changes) steps 4 and 5 are simply repeated.

Setup of the portable aiming unit 30, 300 involves placing a tripod and swiveling a laser dot to an obvious, moderate-size target. It should take under 30 seconds for a trained crew member. The portable aiming unit 30, 300 uses an embedded compass or other means to establish the absolute orientation information between it and the sighting unit 20. In the event of magnetic interference, this information can be entered manually, as is the case for use of a relative reference, such as a permanent structure in the vicinity, or ordinary gun laying procedures can be used with the portable aiming unit 30, 300 providing only deviation information following the setup.

System 10 will track absolute elevation and deviation of the weapon electronically. Because the portable aiming unit 30, 300 is set to provide an absolute reference, information can be transmitted on a round-by-round basis to the Fire Direction Center processor 40 to monitor actual firing orientation at all times. The same accelerometer system employed to track the plane of the earth, can also track the shock of round loading and firing. Orientation can be sampled directly before and after discharge to provide detailed estimates of the shell's departure angle. Alarms can be established both at the Fire Direction Center processor 40 and at the portable aiming unit 30, 300 or sighting unit 20 to warn the Fire Direction Center processor 40 or the gunner, respectively, against excess or uncorrected variations from the requested firing angles. This operational mode and required communications are straight forward and easily implemented by those skilled in the art.

Communications between the portable aiming unit 30, 300 and the Fire Direction Center processor 40 use a digital communications system and may include a wired and/or wireless link. Encoded spread-spectrum RF transmission is preferred, however, optical or other links may also be used. The portable aiming unit 30, 300 and the sighting unit 20 can communicate using modulation of the same IR LED/Laser diode that are employed in the alignment system, or a secondary optical and/or RF link can be employed. Obviously, as the portable aiming unit 30, 300 is located in such close proximity to sighting unit 20, a secondary "hard wired" link may be employed.

System 10 must be efficiently implemented on a robust embedded platform. The algorithms utilized in system 10 do not require exotic hardware and are thus well within the capabilities of basic processing hardware currently available. The diode emitters have trivial power requirements, while CCD or CMOS elements can be duty cycle managed to only switch on for brief time periods during each alignment request. It is known that much of the power consumed in a typical camera application relates to continuous "video" functions. System 10 extends battery life and maintains signal stealth by an operation that takes brief samples, only when triggered, each sample requiring only a fraction of a second. The power draw of system 10 will typically be such that communications functions become the largest factor in field battery life.

Figure 6:
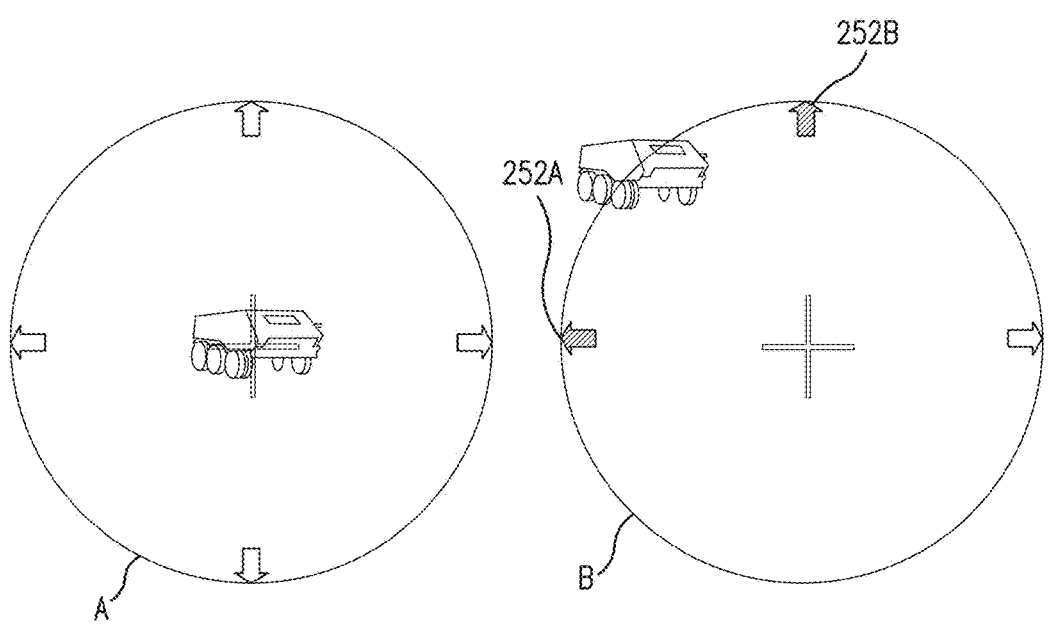
FIG. 6 is an illustration of an implementation of the present invention where target images and indicators are used to establish relative position.

System 10 can be employed where the multiple reference heads 220 and 36 utilize CCD/CMOS cameras to directly and quickly sight on a visual target, either in the IR spectrum or with the corresponding filter plates removed. By this arrangement of system 10, illustrated in FIG. 6, two or more viewing devices A and B are arranged with a communication link between them to establish relative position, to establish relative orientation, and to communicate alignment information therebetween. The display 252 that may be overlaid on an acquired image displayed on an LCD display panel of the sighting unit 20 (viewing device B) to provide a guidance system so that one designated user observing a target on viewing device A can guide the independent pointing of one or more other weapons 50. Generally, the optical sighting devices A and B will function just like their passive counterparts—magnifying targets and aligning the attached gun tube 54. However, when the guidance system is activated, transmitted information will allow each receiving unit to determine its relative alignment with the sending unit (portable aiming unit 30, 300 or Fire Direction Center processor 40). One or more of the indicators visible in the optical viewing device B, such as an overlay of an arrow display, like display system 252, where the indicators 252a and 252b are enabled to indicate displacement directions, directs the receiving user to move the corresponding sighting device so that it is aligned with that of the sending unit A.

There are various means of providing guidance to the receiving users. These include illuminated LED's, overlaid optical images, numeric representations, and audio feedback. The calculations for aligning multiple optical sighting devices are known in the art and disclosed in U.S. Pat. No. 7,225,548, as an example. The units create a tight response loop that allows one user to very accurately approximate the aim point of another. A number of methods of determining alignment are available and can be implemented together or separately. These methods include "absolute" references such as compass headings and declination, as well as other "independent" reference systems such as rotational accelerometers and GPS.

However, using the alignment methods discussed herein for the portable aiming unit 30, 300 and sighting unit 20, there is presented a novel system using "relative" references that are often simpler and cheaper to implement than absolute modes, and increase accuracy by providing precise differential information. Relative references include RF field alignment; ultrasonic, IR and RF pulse timing; target painting; external reference framing; common reference energy beams; and image feature alignment. Each fundamental method is designed to orient physically separated devices so that their primary optical axes are parallel. System 10 also improves upon the problem of aligning multiple imaging devices, where the devices are distantly separated, by providing parallax compensation. System 10 thereby offers a unique advantage to its users by facilitating quick and accurate sight-picture information sharing.

Fixed reference information (particularly in azimuth) is useful for some users but not strictly necessary in all cases and there are certain downsides to these familiar orientation methods. Encoding sensors with sufficient accuracy can be expensive and problematic to maintain. Magnetic compasses are susceptible to external fields, GPS is susceptible to signal loss, and accelerometers and encoding gyroscopes are subject to cumulative drift errors. Accelerometers and gyroscopes used in azimuth have an additional disadvantage because they require an initial "alignment" step to synchronize the two devices. The most significant limitation, however, is that independent frame reference methods cannot provide the relative user and target position information required to align handheld, mobile sighting devices without additional differential measurement corrections. Even independent frames such as GPS that provide absolute positions are not accurate enough to give a reliable baseline distance between users separated by only a few meters, and provide no information about the target location. Using the arrangement of the aligned portable aiming unit 30 and sighting unit 20 using an energy beam, a system that focuses on providing precise relative information, position information is provided that can supplement fixed reference azimuth and elevation and for many purposes, can replace them.

As previously mentioned, RF transmissions can alternately be used to provide a reference frame. With properly chosen antennas, the RF energy of fixed relative polarity to the optical axis can be used by measuring proportional signal strengths and identifying peaks Improvements, such as measurements of phase and Doppler information can also be applied and are disclosed in U.S. Pat. No. 7,225,548.

RF alignment methods have certain limitations arising from the inability to control the transmission medium. In the field, one cannot generally maintain controlled free-air transmission from point to point. If intervening obstructions are introduced then RF waves may be refracted or reflected, destroying the value of the absolute reference. Exemplary obstructions include weather, trees, buildings, and even users' body parts. Choice of frequency ranges and various well-known phase and error correction procedures can mitigate this situation. While an RF alignment implementation is operable, it is believed that the low power IR approach described above provides a stealthier solution.

Figure 7A:
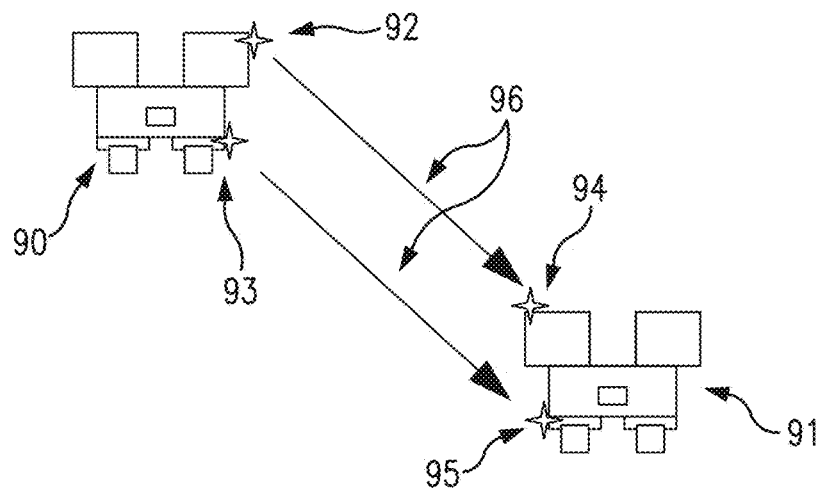
FIG. 7A is a schematic diagram showing a common reference beam alignment system applicable to the present invention.

FIG. 7A illustrates another method for aligning optical devices, as may be applied between the portable aiming unit 30, 300 and the sighting unit 20, or between the Fire Direction Center processor 40 and the portable aiming unit 30, 300, or even between the Fire Direction Center processor 40 and the sighting unit 20. Two optical sighting devices 90 and 91 each respectively contains a plurality of transmitters 92 and 93 and a plurality of corresponding receivers 94 and 95, at known locations on their physical framework. In basic operation each transmitter 92, 93 sends out a beam of energy that is received and detected by one or more of the receivers 94, 95. The energy beams 96 may consist of audio, ultrasonic, radio frequency, light or any other medium that may be transmitted and received in a point-to-point fashion. In the implementation example shown, transmitter 93 sends a signal that is received by receiver 95, while transmitter 92 sends a signal that is received by receiver 94. The distance between each transmitter/receiver pair is determined either absolutely or as a relative value. Distance between sensor points may be determined according to the type of energy beam utilized by means of pulse-timing, phase-alignment and/or other well-known means.

Figure 7B:
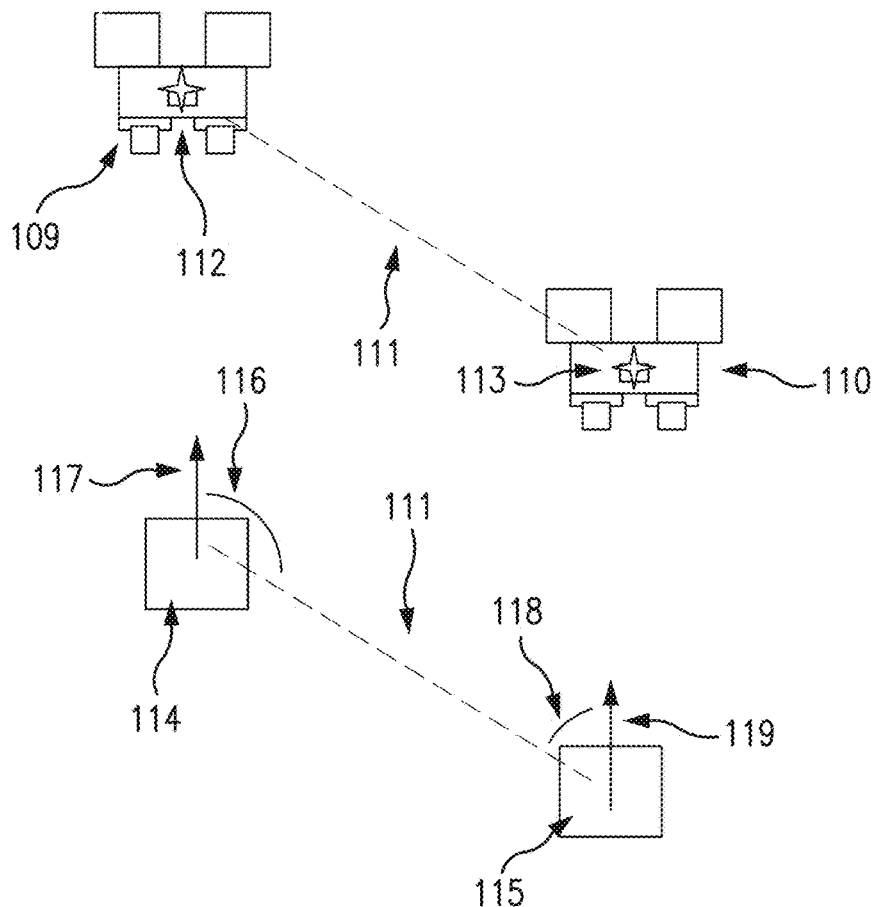
FIG. 7B is a schematic diagram illustrating a multi-sensor timing/phase alignment system applicable to the present invention.

Referring now to FIG. 7B, there is illustrated another alignment method that may be implemented in system 10, based upon automatic direction finding with respect to a common reference beam. Two optical sighting devices 109, 110 each contain a means for determining their angle of alignment relative to a common reference beam 111. The reference beam can be imagined as a physical rod or cord stretched tight between the units. However, the reference beam will generally be composed of energy radiated from one or both of the devices 109, 110 by means of transmitter-receiver pair or transceivers 112, 113. As before, the energy beams may consist of audio, ultrasonic, radio frequency, light or any other medium that may be transmitted and received in such a fashion that its radial direction can be determined.

Figure 8:
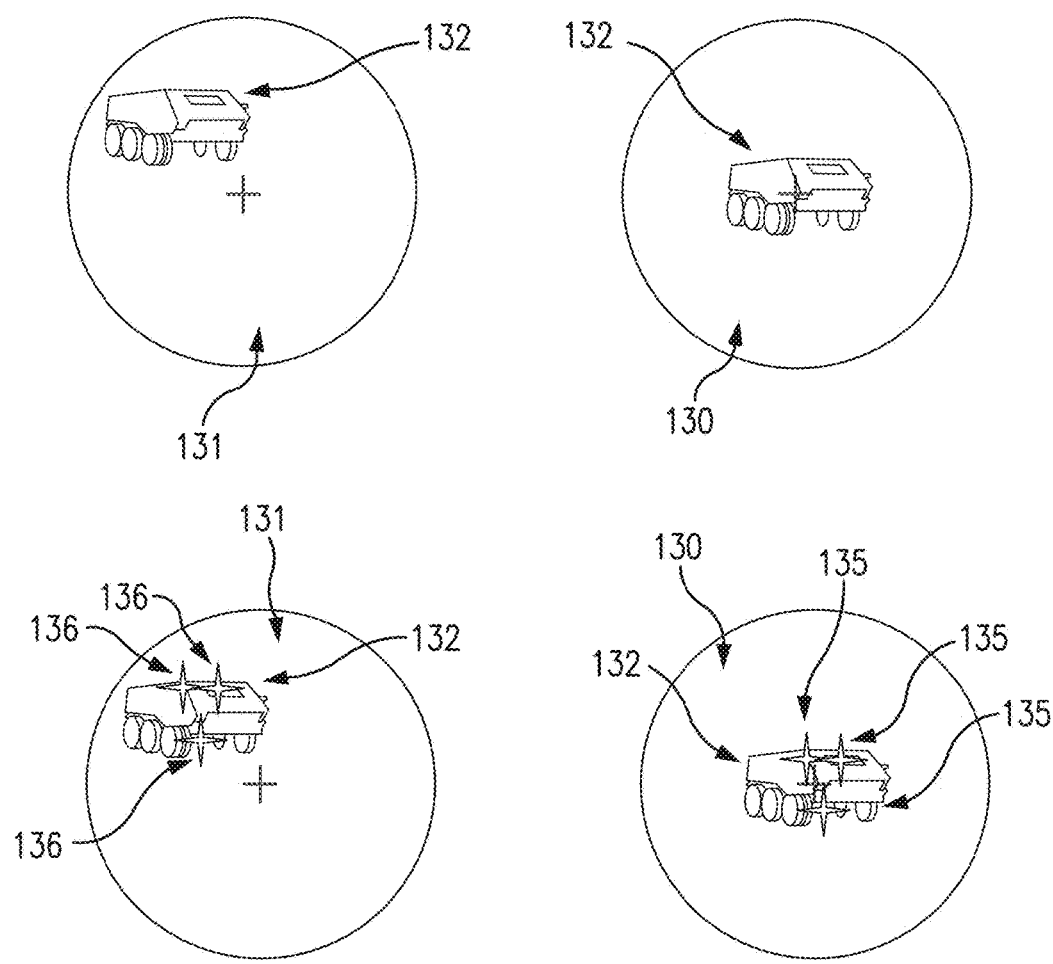
FIG. 8 is a schematic illustration of an image feature recognition alignment system applicable to the present invention.

Another alignment method applicable for use in system 10 is shown in FIG. 8. The method is disclosed in U.S. Pat. No. 7,225,548, but can be adapted to provide alignment between the portable aiming unit 30, 300 and the sighting unit 20. This method is different from the previous methods in that it relies only on the images within the field of view and not on an external or a relative orientation reference. For this method, cross-correlation of image filtered image components is the image processing technique utilized. Other processing techniques, such as those disclosed in a publication by David G. Lowe, *Distinctive image features from scale-invariant keypoints*. 2, s.l.: Kluwer Academic Publishers, November 2004, International Journal of Computer Vision, Vol. 60, pp. 91-110. 0920-5691, can be used.

The right portion of the figure shows the familiar situational setup with the master view 130 (at the portable aiming unit 30, 300 or the Fire Direction Center processor 40) oriented on a target 132, while the slaved view field 131 (at the sighting unit 20 or the portable aiming unit 30, 300) is misaligned. By utilizing well known image processing techniques, the target images are filtered and transformed in such a way that similar reference points 135, 136 are consistently established. Processing is quite complicated when using separated optical sighting devices since the reference point results must be consistent for two reasonably offset views of the same target. However, in application to a single gun sight, the view angle will remain substantially the same thus increasing the number of features that can be tracked and re-detected as azimuth and elevation angles shift. Once the reference points 135, 136 have been established and mapped to one another, further processing provides feedback, which may be in the form described for sighting unit 20, to adjust the aim of the slave sighting device appropriately to align the points. This image alignment method requires only data communications between units and the devices need not radiate direction finding or other specialized energy transmissions.

The descriptions above are intended to illustrate possible implementations of the present invention and are not restrictive. Although the invention has been described in connection with specific forms and embodiments thereof, it will be appreciated that variations, modifications, and alternatives other than those discussed above may be resorted to without departing from the spirit or scope of the invention. Such variations, modifications, and alternatives will become apparent to the skilled artisan upon review of this disclosure. For example, equivalent elements may be substituted for those specifically shown and described. Certain features may be used independently of other features, various methods independently described may be combined, and in certain cases, particular locations of elements or method steps may be reversed or interposed, all without departing from the spirit or scope of the invention as defined in the appended claims. The scope of the invention should therefore be determined with reference to the description above and the appended claims, along with their full range of equivalents.

What is claimed is:

1. A method of aiming at least one shell firing weapon, comprising:
   positioning a portable aiming reference radially from the weapon;
   establishing at least one spatial reference at said portable aiming reference;
   locating a sighting guide on said weapon;
   establishing at least one energy emission between said portable aiming reference and said sighting guide and using said energy emission to determine a relative spatial alignment therebetween;
   outputting a visual indication of said relative spatial alignment.

2. The method of claim 1, where the positioning of a portable aiming reference includes positioning the portable aiming reference a distance less than 5 meters from the weapon.

3. The method of claim 2, where the positioning of a portable aiming reference includes positioning the portable aiming reference a distance of 2 meters from the weapon.

4. The method of claim 1, further comprising spatially aligning said weapon with target coordinates with respect to said relative spatial alignment with said portable aiming reference.

5. The method of claim 1, where the spatially aligning of said weapon with target coordinates includes compensating said spatial alignment with said target coordinates for parallax based on angular differences between a location of said portable aiming reference and said sighting guide and between said location of said portable aiming reference and a base of said weapon.

6. The method of claim 1, where the establishing of at least one spatial reference at said portable aiming reference includes the providing said portable aiming reference with a compass device for providing at least an azimuth reference.

7. The method of claim 6, where the providing of said portable aiming reference with a compass device includes providing a fluxgate compass.

8. The method of claim 1, where the establishing of at least one spatial reference at said portable aiming reference includes the providing said portable aiming reference with an accelerometer for at least one axis.

9. The method of claim 1, where the establishing of at least one energy emission includes providing a constellation of at least one optical emitter.

10. The method of claim 9, where the providing of a constellation of at least one optical emitter includes providing a constellation of at least one low power infrared source.

11. The method of claim 1, where the establishing of at least one energy emission includes providing said sighting guide with an aiming laser to be directed at said portable aiming reference.

12. The method of claim 1, where the locating of a sighting guide on said weapon includes locating an optical sighting unit on said weapon and capturing an image generated therethrough.

13. The method of claim 12, where the capturing of an image includes coupling an image sensor to an eyepiece of said optical sighting unit.

14. The method of claim 12, where the capturing of an image includes replacing a telescope portion of said optical sighting unit with said image sensor.

15. The method of claim 1, where the establishing of at least one energy emission includes digitally capturing an image generated through said sighting guide.

16. The method of claim 15, where the image generated through said sighting guide is captured with a CCD image sensor.

17. The method of claim 15, where the image generated through said sighting guide is captured with a CMOS image sensor.

18. The method of claim 15, where the image generated through said sighting guide is captured with a digital camera.

19. The method of claim 1, where the outputting of a visual indication of said relative alignment is followed by zeroing said sighting guide to said relative alignment and providing an indication of any subsequent deviation therefrom.

20. The method of claim 1, where the establishing of at least one spatial reference includes establishing an absolute spatial reference.

21. The method of claim 1, where the establishing of an absolute spatial reference includes obtaining global positioning (GPS) coordinates from a GPS receiver included in said portable aiming reference.

\* \* \* \* \*